May 17, 1960     W. A. ROCKAFIELD     2,937,054
BEARING STRUCTURE
Filed Nov. 29, 1957
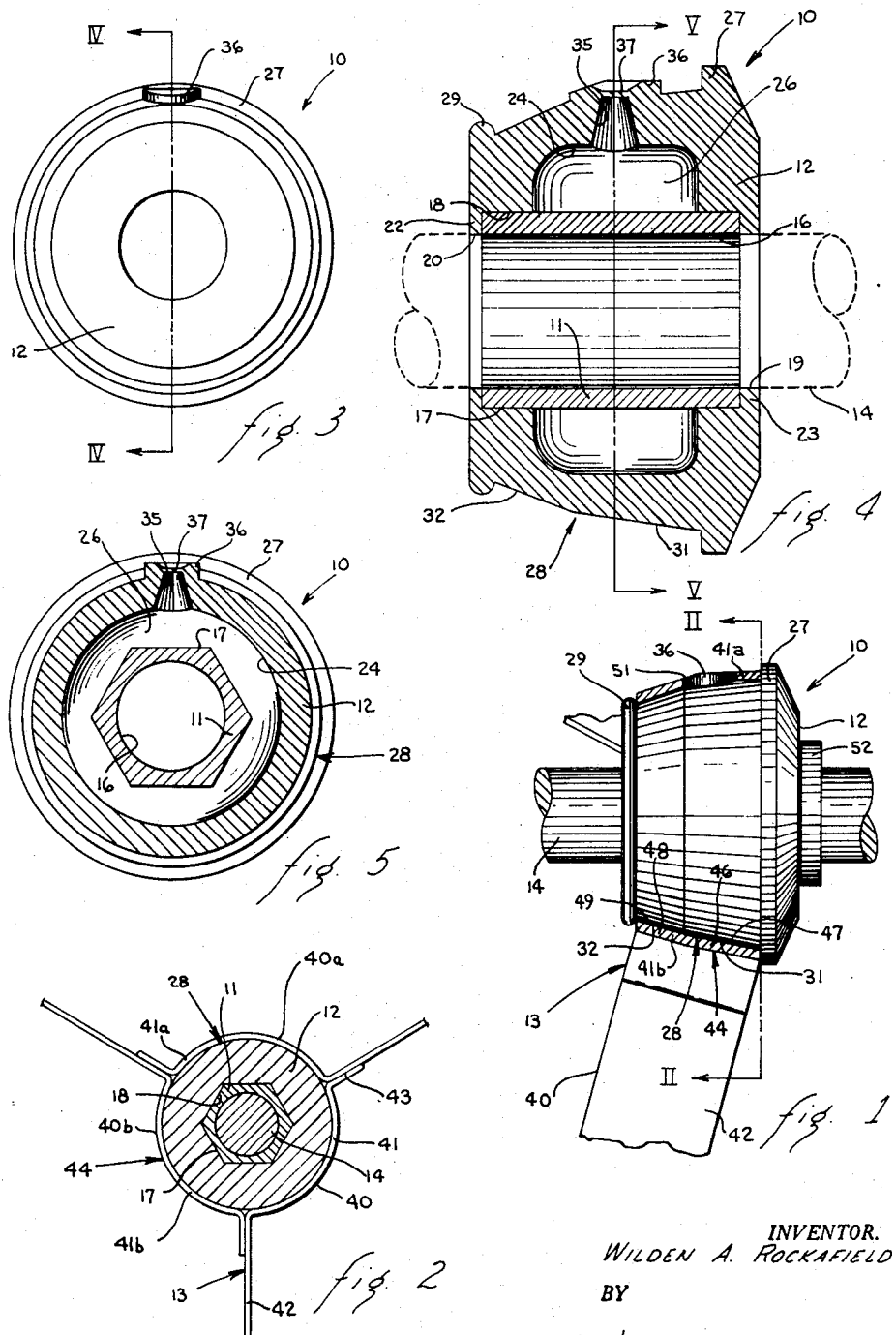
INVENTOR.
WILDEN A. ROCKAFIELD
BY
Woodhams, Blanchard & Flynn
ATTORNEYS

United States Patent Office 2,937,054
Patented May 17, 1960

2,937,054
BEARING STRUCTURE

Wilden A. Rockafield, Kalamazoo, Mich., assignor to The Brundage Company, Kalamazoo, Mich., a corporation of Michigan Application November 29, 1957, Serial No. 699,535

3 Claims. (Cl. 308—26)

This invention relates, in general, to a sleeve type bearing assembly and, particularly, to one having a structure capable of absorbing shaft vibrations and isolating them from the means supporting the bearing assembly, such structure being adaptable for production at an extremely low cost.

In the manufacture of centrifugal blowers, one or both ends of a shaft supporting the blower wheel is usually supported by a bearing which is in turn secured to the blower housing. In order to promote vibration-free operation of the blower assembly, it is desirable that the bearing assembly or its mounting include some type of elastomeric substance to minimize the transmission of vibration from the shaft to the housing, and this general approach has been utilized for a long time. However, in a constant effort to improve bearings of this general type it has been observed that the existing forms of vibration isolators for bearing assemblies have certain disadvantages which it is the purpose of the present invention to eliminate.

More specifically, bearing assemblies made according to previous practice have been composed of five or more parts, all of which involve cost in the manufacturing, handling, inventory and assembling of the bearing assembly. In items as highly competitive as blower assemblies, it is desirable that all elements involving cost be reduced to an absolute minimum. In pursuance of this objective, the bearing assembly of the present invention requires only two parts. Further, in prior bearing assemblies of this type, a bronze sleeve has been press-fitted into a cast, stamped, or drawn retainer which engages the sleeve at its opposite ends. The central portion of the sleeve is spaced from the retainer to provide an annular passageway to receive either lubricating oil or cooling fluid, according to the requirements of a particular installation. This arrangement tends to effect a radially inward compression of the ends of the sleeve, which concentrates the bearing load at the ends of the sleeve. As a result, the ends of the sleeve are worn prematurely and the corresponding portions of the shaft are similarly worn and scored until the sleeve and shaft have reshaped themselves to distribute the load along the entire journal. Accordingly, when a bearing must be replaced, the shaft must also be replaced in many instances.

Accordingly, a principal object of the invention has been to provide a sleeve bearing structure which is capable of some self-alignment, which will substantially isolate shaft vibrations from the bearing support, and which is comprised of only two parts, whereby its manufacture and assembly can be effected at a very low cost.

A further object of the invention has been to provide a bearing structure, as aforesaid, wherein no excessive loads are created between any particular part of the sleeve and the shaft with which the bearing structure is used and hence there will be no distortion or abnormal wear of these parts.

A further object of the invention has been to provide a bearing structure, as aforesaid, wherein said sleeve is mounted in an elastomeric substance so that it not only remains substantially cylindrical both before and after assembly of the bearing structure, but also minimizes the transmission of vibrations from the shaft to the bearing supporting device, such as the blower housing.

Other objects and purposes of this invention will be apparent to persons acquainted with bearing structures of this general type upon reading the following specification and examining the accompanying drawings, in which:

Figure 1 is a side elevational view of a bearing assembly characterizing the invention and including a fragment of a bearing support bracket.

Figure 2 is a sectional view taken along the line II—II of Figure 1.

Figure 3 is an end view of a bearing assembly characterizing the invention.

Figure 4 is a sectional view taken along the line IV—IV of Figure 3.

Figure 5 is a sectional view taken along the line V—V of Figure 4.

For convenience in description, the terms "inner," "outer," and derivatives thereof, as used herein, will have reference to the geometric center of the bearing assembly and parts thereof.

General description

In order to meet the objects of the invention, including those set forth above, there has been provided a self-aligning, vibration isolating bearing assembly comprised of a bearing sleeve supported in an annular sleeve retainer molded in one piece from an elastomeric material, such as rubber. Said retainer permits moderate self-alignment of the sleeve and includes structure for positively resisting both axial and rotational movement of the sleeve with respect to said retainer. Said retainer also has an annular compartment circling said sleeve adjacent thereto for receiving a lubricant or for circulating cooling fluid. The means resisting axial movement of the sleeve with respect to the retainer also serves as a dust seal.

Detailed construction

The bearing assembly 10 (Figures 1 and 3), which illustrates a preferred embodiment of the invention, is comprised of a bearing sleeve 11 (Figure 3) which is supported by, and housed within, an annular bearing sleeve retainer 12, which is preferably molded in one piece from an elastomeric material, such as rubber, which is stiff enough to maintain its shape and retain said sleeve under normal conditions of use, but sufficiently resilient and flexible to provide the desired characteristics of self-alignment and vibration isolation for the sleeve 11. As shown in Figures 1 and 2, the bearing assembly 10 is mountable in a bearing support bracket 13 for the purpose of rotatably supporting a shaft 14.

The bearing sleeve 11 (Figures 2, 4 and 5) may be fabricated from any conventional bearing material, such as Babbitt metal, brass, sintered bronze, or such plastic materials as nylon or Teflon and has a cylindrical central shaft opening 16 in which the shaft 14 is slidably and rotatably receivable. Said sleeve 11 has, in this particular embodiment, a hexagonal peripheral surface 17 for reasons appearing hereinafter.

The bearing sleeve retainer 12 (Figures 2 and 4), which is preferably circular in cross-section, has a substantially coaxial sleeve opening 18 extending therethrough. Said sleeve opening 18 preferably has a hexagonal cross-section which is substantially identical to the hexagonal contour of the peripheral surface 17 on the sleeve 11, thereby providing snug nonrotational reception of said sleeve 11 within the sleeve opening 18. The sleeve opening 18 is axially longer than the bearing sleeve 11 and has portions 19 and 20 of reduced diameter which are provided by the annular flanges 22 and 23, respectively, located at the opposite axial ends of said opening 18. The reduced portions 19 and 20 of the sleeve opening 18 are circular and preferably of substantially the same diameter as the shaft opening 16 in the bearing sleeve 11. Thus, the flanges 22 and 23 serve both as integral thrust or retaining collars for the sleeve 11 and also as dust seals.

An annular, substantially coaxial recess 24 (Figures 4 and 5) is provided in the wall of the sleeve opening 18 between, and preferably spaced from, the flanges 22 and 23. As shown in Figure 5, the recess 24 provides a lubricant or cooling compartment 26 which completely encircles the bearing sleeve 11 and communicates therewith throughout such encirclement.

The retainer 12 (Figures 3 and 4) has an integral annular ridge 27, which coaxially encircles, and extends radially outwardly from, the periphery of said retainer substantially adjacent to one axial end thereof. An integral annular and substantially coaxial bead 29 extends around, and radially from, the periphery of said retainer 12 adjacent to the other end thereof. The peripheral surface 28 of the retainer 12 between the annular ridge 27 and the bead 29 is preferably, but not necessarily, contoured to define the frustrums of two cones having different slopes. The first conical surface 31, which extends from the annular ridge 27 approximately half-way toward the bead 29, has a relatively steep slope. The second conical surface 32, which extends from the first conical surface 31 to the bead 29, has a slope which is somewhat less steep than the slope of the first conical surface 31.

A passageway 35 extends, preferably radially, from the recess 24 through the peripheral surface 28 of the retainer 12. An integral boss 36 is provided upon the peripheral surface 28 at, and surrounding, the outer end of the passageway 35. A relatively thin membrane 37, which is preferably integral with and, therefore, of the same material as the body of the retainer 12, extends across, and completely blocks, the passageway 35 between the ends thereof. Said membrane 37, being flexible and resilient, can be easily pierced for the purpose of introducing a lubricant through the passageway 35 into the lubrication compartment 26 without damaging its dust sealing qualities.

The bearing support bracket 13 is comprised in this particular embodiment of three substantially identical support elements 40, each of which has an arcuate retainer embracing portion 41 extending through an arc of approximately 120°. A support arm 42 is integral with, and extends substantially radially from, said embracing portion at one end thereof. A connecting flange 43 is integral with, and extends substantially radially from, the embracing portion at the other end thereof. The three support elements 40, 40a and 40b are arranged, as appearing in Figure 2, so that their embracing portions 41, 41a and 41b form a support ring 44. Said ring 44 is made rigid by connecting the flange 43 of one support element to the support arm 42 of the next adjacent element and so forth around the ring, such connection being effected by any convenient means, such as welding, riveting, brazing or the like. Each embracing portion 41 has, as shown in Figure 1, a first arcuate segment 46, which has substantially the same contour of its inner surface 47 as the first conical surface 31 on the periphery of the retainer 12. Each embracing portion 41 also has a second arcuate segment 48 having an inner surface 49 which conforms in shape substantially exactly with the second outer conical surface 32 of said retainer 12. Accordingly, the support ring 44 provides a conically shaped socket into which the retainer 12 is snugly receivable. The axial length of the supporting ring 44 is preferably approximately equivalent to the axial distance between the adjacent edges of the annular ridge 27 and the bead 29.

One of the embracing portions, here the embracing portion 41a, is provided with an opening 51 through which the boss 36 may extend. Accordingly, when the retainer 12 is inserted into the support ring 44, said retainer must be compressed in the neighborhood of the boss 36 to permit said boss to slide into the ring 44 until it reaches and extends up through the opening 51. The retainer 12 must also be compressed adjacent to said bead 29 as it passes through the small end of the ring 44 to position itself thereagainst, as shown in Figure 1. Accordingly, engagement of the boss 36 with the walls of the opening 51 will positively resist rotation of the retainer 12 with respect to the support ring 44, hence with respect to the support bracket 13. Furthermore, the annular ridge 27 will cooperate with the bead 29 to positively resist axial movement of the retainer 12 with respect to the support ring 44, hence with respect to the support bracket 13.

Under some conditions of operation, it may be necessary to provide a locking collar 52 upon the shaft 14 adjacent to the outer end of the retainer 12, which end is adjacent to the annular ridge 27, in order to limit leftward (as viewed in Figure 4) movement of the shaft 14 with respect to the bearing. Thus, where such a collar is used, the flange 23 will further function as a cushioning washer between the collar 52 and the sleeve 11 and thereby eliminate the need for the separate washer now commonly used for this purpose.

*Operation*

Inasmuch as there are only two parts in the entire bearing assembly 10, the preparation of such assembly for operation is relatively simple. Either the flange 22 or the flange 23 is stretched to increase the circumference of the corresponding reduced portion 19 or 20 of the sleeve opening 18. Then the bearing sleeve 11 is inserted into the sleeve opening 18 through the stretched portion until said sleeve is disposed between the flanges 22 and 23. The peripheral surface 17 of the sleeve 11 is snugly embraced and held against rotation by the walls of the sleeve opening 18, due to the cooperating irregular shapes of their mutually engaging surfaces. However, the firmness with which the sleeve 11 is thus positioned is not sufficient to effect any distortion whatsoever in the shape of the sleeve 11. Accordingly, the journal of a shaft 14 inserted into the bearing sleeve 11 for rotatable support thereby is immediately, accurately and evenly embraced and journaled throughout the length of such sleeve in the most desirable manner.

After the sleeve 11 is positioned within the retainer 12, the resultant bearing assembly is then inserted into the support ring 44 through the outer and larger axial end thereof. The tendency of the boss 36 and bead 29 to interfere with such insertion is easily overcome by compression of the resiliently flexible retainer in the regions of the boss 36 and the annular ridge 27. Under normal circumstances, the shaft 14 can now be inserted into the bearing sleeve 11 for immediate operation. If for reasons peculiar to the installation, the support bracket 13 is installed so that the axis of the support ring 44 is not quite coincident with the axis of the sleeve 11, the retainer 12 automatically yields and thereby adjusts itself within reasonable limits to the needs of the installation. Accordingly, the retainer 12 automatically provides self-alignment of the bearing assembly to accommodate minor discrepancies in axial relationships.

Lubrication of any convenient conventional type may be inserted through the membrane 37 and the passageway 35 into the lubrication compartment 26 and adjacent to the sleeve 11. Where, for example, the sleeve 11 is fabricated from sintered bronze, the lubricant within the compartment 26 will move through the interstices in the sleeve 11 to lubricate that portion of the shaft 14 journaled within the opening 16 in the sleeve 11.

Due to the resilient flexibility of the material in the retainer 12, shocks and vibrations, or other disturbances created in the shaft 14 as a result of the rotation thereof will be effectively damped and isolated from the support bracket 13 by the said retainer 12. It will also be seen that the flanges 22 and 23, which are preferably integral with the remainder of retainer 12, may be arranged to closely encircle, without materially impeding the rotation of, the shaft 14 adjacent to the ends of the sleeve 11 for the purpose of preventing undesirable materials, as dust and dirt, from reaching the journaled portion of said shaft within the sleeve 11.

Accordingly, the one piece bearing sleeve retainer 12 serves the multiple purposes of compensating for minor misalignment of the shaft 14, isolating shaft vibrations, housing the bearing lubricant, sealing the bearing surfaces from dust and the like, and providing the entire support and retention for the bearing sleeve. It will also be observed that, under normal circumstances, the above disclosed structure characterizing the invention also acts to prevent high noise levels, which often result from, and occur during, the transmission of vibrations.

Although a particular preferred embodiment of the invention has been disclosed in detail hereinabove for illustrative purposes, it will be understood that variations or modifications of such disclosure, which lie within the scope of the appended claims, are fully contemplated.

I claim:

1. A bearing assembly, comprising: a bearing sleeve, said sleeve having a circular opening therethrough and having a polygonal periphery; a one-piece, annular sleeve retainer of elastomeric material, said retainer having a substantially coaxial opening therethrough, said opening in said retainer having polygonal portions at its axial ends resiliently snugly engaging the end portions of the periphery of the sleeve to prevent relative rotation therebetween, said opening in said retainer having an enlarged central portion defining an annular recess between said end portions and surrounding the central portion of said sleeve; said retainer having a passageway extending from said recess through the periphery thereof; said retainer having inwardly projecting flanges at the ends thereof, said flanges bearing against the ends of said sleeve and holding same against axial movement within said retainer.

2. A bearing assembly, comprising: a cylindrical bearing sleeve having a continuous internal wall defining a circular opening therethrough and having a polygonal periphery; a one-piece, annular sleeve retainer of elastomeric material, said retainer having a substantially coaxial opening therethrough, said opening in said retainer having polygonal portions at its axial ends resiliently snugly engaging the end portions of the periphery of said sleeve to prevent relative rotation therebetween, said opening in said retainer having an enlarged central portion defining an annular recess between said end portions and surrounding the central portion of said sleeve; a boss on the periphery of said retainer and a passageway extending from said recess through said boss; said retainer having inwardly projecting flanges at the ends thereof, said flanges bearing against the ends of said sleeve and holding same against axial movement within said retainer, said retainer having an outwardly projecting bead at one end thereof and having an outwardly projecting ridge at the other end thereof; a holding device received between and held against axial movement by said bead and said ridge, said holding device surrounding the periphery of said retainer and having an opening through which said bead extends whereby said retainer is held against rotational movement with respect to said holding device.

3. A bearing assembly, comprising: a cylindrical bearing sleeve having a continuous internal wall defining a circular opening therethrough and having an out-of-round periphery; a one-piece, annular sleeve retainer of elastomeric material, said retainer having a substantially coaxial opening therethrough, said opening in said retainer having out-of-round portions at its axial ends resiliently snugly engaging the end portions of the periphery of said sleeve to prevent relative rotation therebetween, said opening in said retainer having an enlarged central portion defining an annular recess between said end portions and surrounding the central portion of said sleeve; a passageway extending from said recess through the periphery of said retainer; said retainer having inwardly projecting flanges at the ends thereof, said flanges bearing against the ends of said sleeve and holding same against axial movement within said retainer, said retainer having an outwardly projecting bead at one end thereof and having an outwardly projecting ridge at the other end thereof whereby a holding device may be received between and held against axial movement by said bead and said ridge, the peripheral surface of said retainer having a first conical portion extending from said ridge and converging away therefrom, said peripheral surface also having a second conical portion extending from said bead and diverging away therefrom and joined to said first conical portion; and an outwardly projecting boss on the periphery of said retainer through which said passageway extends.

References Cited in the file of this patent

UNITED STATES PATENTS

| | | |
|---|---|---|
| 24,947 | Montgomery | Aug. 2, 1859 |
| 667,037 | Richter et al. | Jan. 29, 1901 |
| 1,963,940 | Duffy | June 19, 1934 |
| 2,223,872 | McWhorter et al. | Dec. 3, 1940 |
| 2,367,832 | Reising | Jan. 23, 1945 |
| 2,518,338 | Lampe | Aug. 8, 1950 |
| 2,594,040 | Le Clair | Apr. 22, 1952 |
| 2,722,464 | Galaba | Nov. 1, 1955 |
| 2,851,314 | Thomson | Sept. 9, 1958 |

FOREIGN PATENTS

| | | |
|---|---|---|
| 1,113,802 | France | Dec. 12, 1955 |